INVENTOR
CLARENCE E. PARKS
BY [signature]
ATTY.

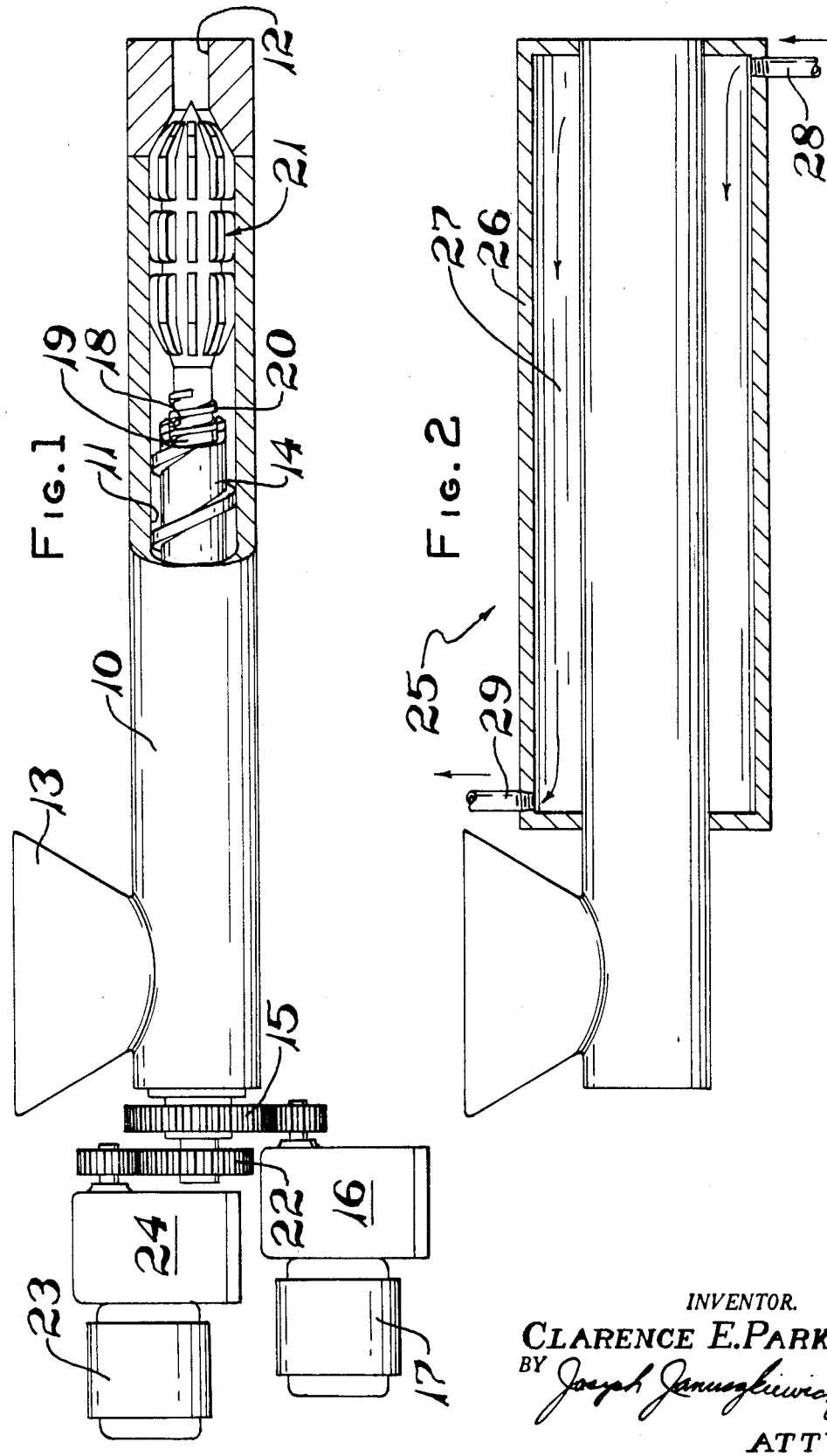

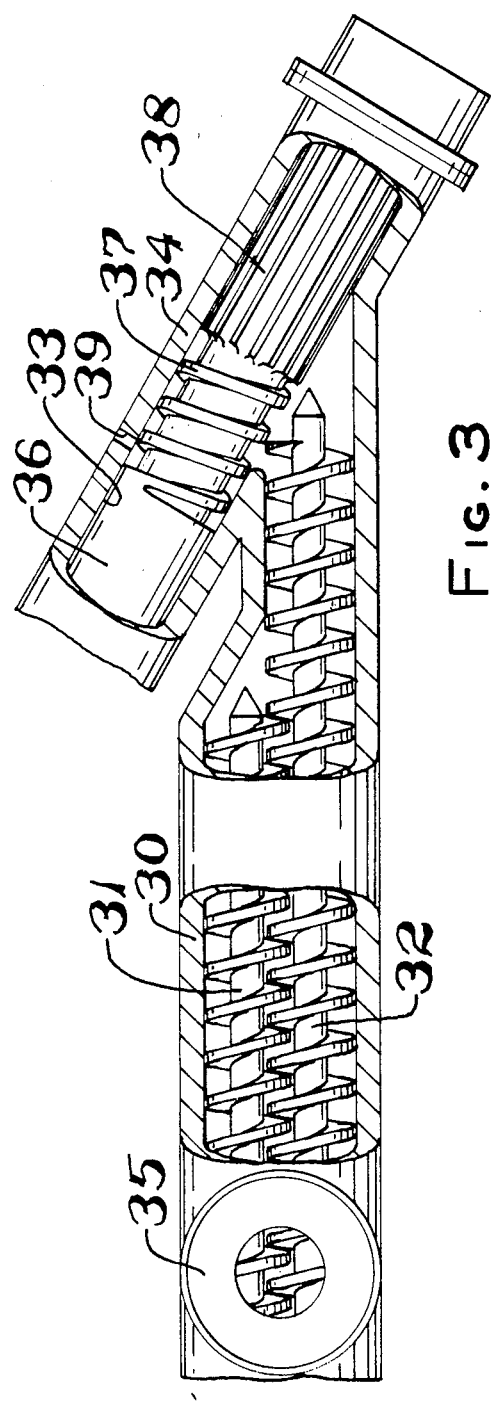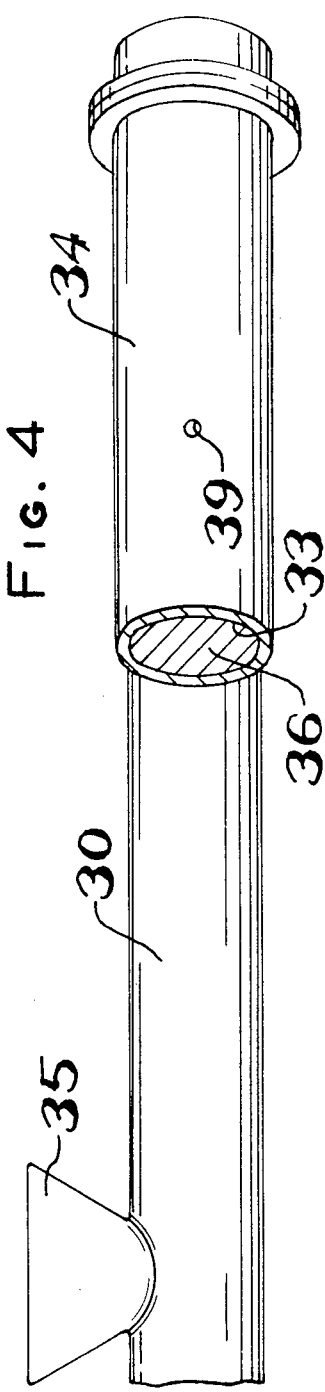

United States Patent Office 3,555,616
Patented Jan. 19, 1971

BEST AVAILABLE COPY 3,555,616
APPARATUS FOR EXTRUDING THERMOPLASTIC
MATERIALS
Clarence E. Parks, Bay Village, Ohio, assignor to The
B. F. Goodrich Company, New York, N.Y., a corporation of New York
Filed Aug. 7, 1967, Ser. No. 658,716
Int. Cl. B29b 1/10, 3/00, 5/02
U.S. Cl. 18—30                                2 Claims

ABSTRACT OF THE DISCLOSURE

An extruder having controlled drive means for the feeding material to be worked to a torpedo which torpedo is independently controlled in its speed to provide controlled working of the material to be extruded. Provision is made for controlling the temperature of the extruder and torpedo.

BACKGROUND OF THE INVENTION

This invention relates to an extruding press and more particularly to a new and improved screw extruder press.

Heretofore various types of extruding screws having a single thread extending the length thereof have been used in the mastication of rubberized products for extrusion for subsequent processing by rolls. Difficulty was encountered in applying such extruders for use in plasticizing thermoplastic materials, which materials were fed into the extruders in powdered, granular, flaked or cubed form. Such difficulties were directed to the inherent differences in the types of materials handled and the fact that the physical characteristics of the thermoplastic materials were reduced in the processing. Further problems arose in overheating, discoloration, decomposition and the pulsatory effluence from the extruder of the plastic material in nonuniform manner and in nonuniform cross section. Most of the above difficulties were solved by either using ram extrusion or by specifically designing the extruder screw to accommodate the change in volume from the granular powdered form to the plasticized form whereby the stock flows uniformly through the extruding die.

SUMMARY OF THE INVENTION

The present invention attains positive uniform flow with uniform desired consistency in appearance of melt while simultaneously providing simple controlled means for working the mix to establish desired conditions without resort to unusual designs in screws. With such invention the screw design, as a factor in processing thermoplastic materials, is eliminated while permitting greater flexibility in processing. Such apparatus permits higher production rates from smaller equipment to produce lower cost cubes, pellets, pipe and various shapes or sheets of materials. The processing time at which such thermoplastic material is maintained at its highest temperature is extremely short, thereby eliminating disintegration or degrading, while also making resin variations such as porosity and particle size of less importance.

It is an object of this invention to provide means for controlling simply and effectively the conditioning of a thermoplastic resin for extrusion.

A further object of this invention is to provide a single unitary device which extrudes plastic materials of varying degrees of composition without need to change component parts.

A further object of this invention is to provide means to effectively control the conditioning of thermoplastic materials through extruders.

Another object of this invention is to provide means for efficiently controlling the temperature of a worked plastic material in an extruder.

A further object of this invention is to increase the production rate from small extruders.

Another object of this invention is to provide an extruder having effective controlled processing which makes resin variations of little consequence.

These and other objects of the invention will become more apparent upon consideration of the following detailed description of a preferred embodiment thereof, when taken in conjunction with the following drawings.

BRIEF DESCRIPTION OF THE DRAWINGS

FIG. 1 is a schematic side elevational view of the extruder with a portion thereof broken away and illustrated in cross section to show the torpedo and the screw.

FIG. 2 is a side elevational view of a modified form of extruder showing a portion thereof in cross section.

FIG. 3 is a plan view of a modified form of extruder shown in FIG. 1 with portions thereof broken away to better illustrate the invention.

FIG. 4 is a side elevational view of the extruder shown in FIG. 3 with portions broken away to illustrate the elements in cooperative relationship.

DETAILED DESCRIPTION

Figure 5:
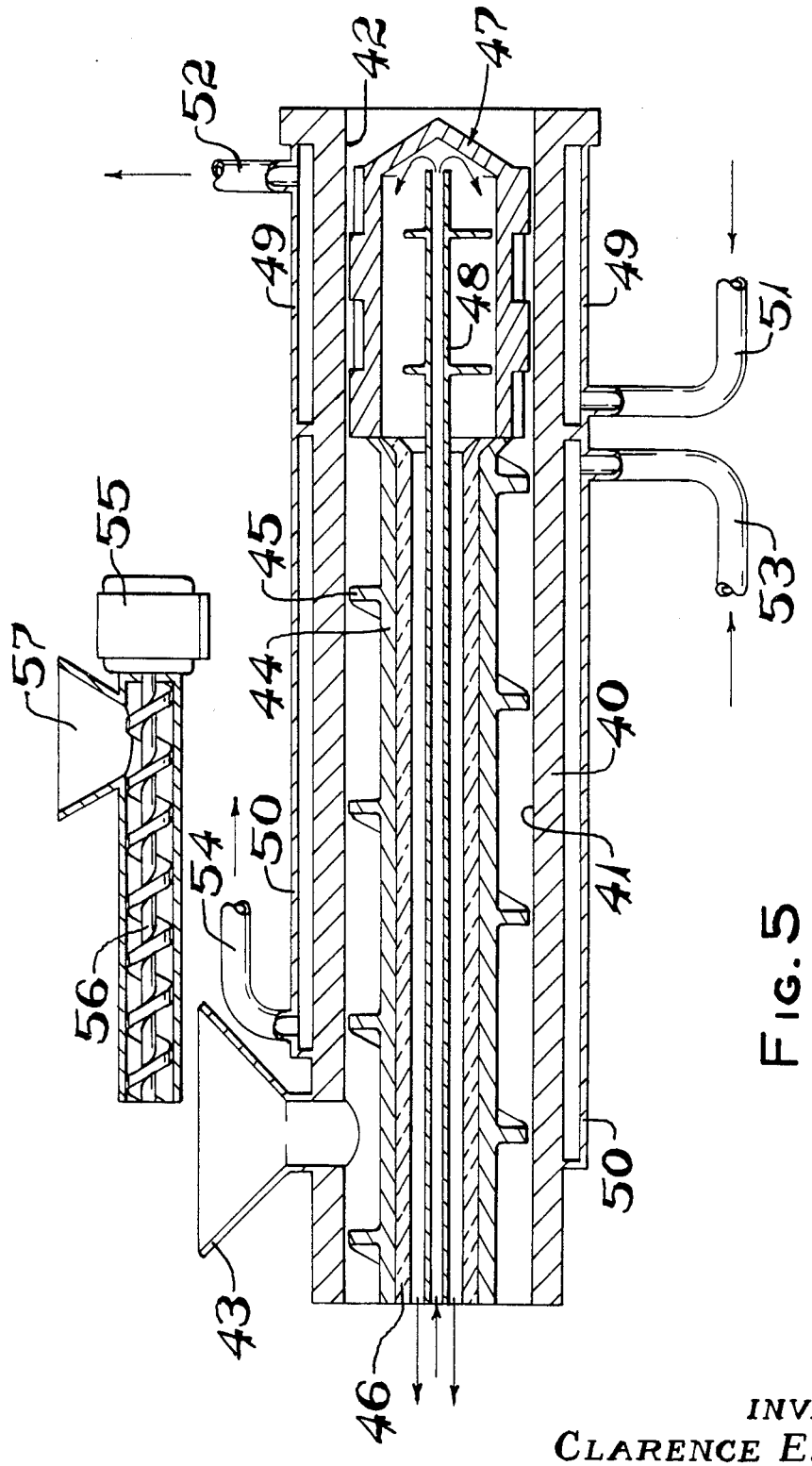
FIG. 5 is a schematic side elevational view in cross section of a modified form of extruder.

Referring to the drawings, wherein like reference characters designate like or corresponding parts throughout the several views, and more particularly to FIG. 1, there is shown an extruder which includes a casing 10 suitably mounted on a base. Casing 10 has a longitudinally extending bore 11 coaxial with an opening 12 on one end thereof, which opening 12 is opened and closed by conventional means in the art to provide communication with the cavity of a die to be attached thereto. A feed hopper 13 is operatively connected to the bore 11 of the casing 10 to supply thermoplastic material thereto. A tubular rod 14 having a single flighted spiral screw of constant depth on its outer surface is closely received by bore 11 to advance unplasticized material rightwardly as viewed in FIG. 1. Rod 14 extends rearwardly through casing 10 to provide a keyed connection to a gear 15 which is suitably conected to a transmission 16 and a motor 17. Rod 14 extends for approximately two-thirds of the length of the casing 10. Tubular rod 14 has a bore 18 which receives for rotation therein a rod 19, which rod 19 has screw flights 20 closely adjacent the end portion of tubular rod 14. Rotation of rod 19 through the screw flights 20 operates to prevent leakage of material between tubular rod 14 and rod 19 to assure advancing of the thermoplastic material through the bore 11 towards the opening 12. The forward portion of rod 19 is operatively connected to a torpedo 21, which torpedo 21 is disposed closely adjacent the opening 12. The rearwardmost end portion of rod 19 projects outwardly through casing 10 and outwardly through tubular rod 14 such that the end portion is keyed to a gear 22, which gear 22 is suitably driven from a motor 23 via transmission means 24. With the tubular rod 14 and the rod 19 connected to separate drive means, the rate of feed by the tubular rod 14 and the intensity of the work performed by the torpedo 21 may be controlled at any desired level to thereby condition the thermoplastic material to a given temperature and viscosity.

In the modified design shown in FIG. 2 the extruder is similar in all respects to the extruder shown in FIG. 1 except that a cooling device 25 is provided, which is controlled to extract heat from the extruder. Such cooling device 25 may be of such size as to encompass only the working zone in bore 11 as defined by bore 11 and torpedo 21.

Cooling device 25 comprises a cylindrical jacket 26 having a chamber 27 defined by the outer surface of casing 10 and the cylindrical jacket 26. An inlet conduit 28 operatively connects a suitably fluid supply source with the chamber 27 whereby a coolant may be pumped into chamber 27. Such fluid means is exhausted from the chamber 27 via a conduit 29 to thereby provide a continuous flow of coolant fluid. Suitable means are provided to regulate the temperature and flow of fluid for cooling the working zone to maintain the desired temperature within the limits desired.

In operation, granular, powdered, flaky or like thermoplastic material is fed through hopper 13 into bore 11 for movement along the single-threaded portion of tubular rod 14 for delivery to the working zone which working zone is along the full length of the torpedo 21. The tubular rod 14 is driven by the infinitely variable speed motor 17 through transmission means 16 at a rate to convey the desired quantity of material to the working zone. The torpedo 21 is rotated by the infinitely variable speed motor 23 through transmission means 24 to plasticize the plastic material to the desired temperature and viscosity which procedure provides a very short heat history conducive to a high production rate at low cost with full control of the processing.

The operation of the modified design shown in FIG. 2 is similar in all respects to that described in the embodiment of FIG. 1 above except that the temperature of the working zone is further controlled by the extraction of heat from the extruder barrel and/or from the working zone by the passage of coolant fluid through chamber 27. Such process is particularly useful in permitting the torpedo to be rotated at faster speeds than heretofore possible because the working of the plastic materials is controlled to obtain the exact temperature for the mix which prevents degrading of heat sensitive materials and makes resin variations in porosity and particle size much less important.

In the modified design shown in FIG. 3, the extruder includes a casing 30 enclosing a pair of longitudinally extending feed screws 31 and 32 with one screw 32 extending a greater distance than screw 31, such that screw 32 communicates with a bore 33 in a casing 34. The axes of screws 31 and 32 are parallel. The flights of screws 31 and 32 interengage for the full length of screw 31 to provide a transfer means of pulverized materials fed thereto via a hopper 35 connected to the upstream portion of the casing 30 housing screws 31 and 32. Screws 31 and 32 are driven at controlled speeds by suitable drive means not shown.

Bore 33 rotatably receives a rod 36 which is suitably driven at selective variable speeds by any conventional means such as shown in FIG. 1. The forward portion of rod 36, closely adjacent the communication with the bore in casing 30 has screw flights 37 which operate to propel thermoplastic material received in bore 33 forwardly thereof. The forwardmost portion of rod 36 is connected to a torpedo 38, which torpedo 38 is closely received by bore 33 for the working of thermoplastic material received thereby. Such thermoplastic material is extruded through a suitable die into the desired shape. Bore 33 has a conduit 39 connecting such bore to suitable means for exerting a vacuum in the rearward portion thereof.

Although two feed screws 31 and 32 are shown, a single flighted feed screw may be used such that the feed screw cooperates with the inner wall surface of the bore within which it rotates to define a conveying passageway of constant size regardless of the axial rotation of the feed screw. Such feed screw would act as a transferring means which conveys plastic materials for working by the torpedo 38.

In operation, the thermoplastic material is fed through hopper 35 into the bore of casing 30 for movement therealong by the screws 31 and 32. Rotation of such screws 31 and 32 operate to deliver the unworked thermoplastic material into bore 33 of casing 34 for propulsion by the flights 37 of rod 36 toward the working zone of torpedo 38. The thermoplastic material is plasticized to the desired consistency by the rotating torpedo 38 whose speed of rotation may be varied at will by the control of the operator to give the optimum amount of work to the plastic at any given extrusion rate. Such thermoplastic material is extruded through a die nozzle connected to the forward portion of the casing 34 for delivery to sizing equipment.

FIG. 5 discloses a further variation on the above described embodiments wherein there is shown an extruder casing 40 having a longitudinally extending bore 41 adapted to be connected via an opening 42 to suitable sizing equipment or mold. A feed hopper 43 is operatively connected to the bore 41 at the rearward portion of the casing 40 whereby thermoplastic material is supplied to such bore 41. Mounted for rotation in the bore 41 of casing 40 is a tubular rod 44 having a deep single-flighted spiral screw 45 of constant depth on its outer surface. Rod 44 extends rearwardly out of casing 40 for connection to a drive means not shown whereby the rod 44 may be rotated at preselected speeds. Tubular rod 44 closely receives on its inner bore an insulating tubular rod 46 for a purpose to be described. Suitably attached to the forward end portion of rod 44 is a hollow torpedo 47. Tubular rod 44 and torpedo 47 support a longitudinally extending tube 48 throughout their length. A suitable rotatable sealing coupling communicates with tube 48 to supply a cooling medium for circulation through the torpedo to control the temperature thereof. Cooling fluid is removed via the clearance space provided between the insulating rod 46 and the tubular rod 48 via a coupling not shown. The casing 40 has a jacket 49 surrounding the forward portion thereof and a jacket 50 surrounding the rearward portion to maintain the casing at predetermined temperatures by the circulation of fluids through such jackets. Jacket 49 has a fluid inlet opening 51 connected to a fluid source and an outlet connection 52. Jacket 50 has a fluid inlet opening 53 connected to a fluid source and an outlet connection 54.

To provide for a controlled feeding of the thermoplastic resin to the hopper 43, a variable speed motor 55 is provided. Through suitable control means, motor 55 controls the speed of rotation of a feed screw 56 which feeds such thermoplastic powder or cubes from a supply hopper 57 to the hopper 43 for delivery to the screw 45.

In the operation of the above described extruder, granular, powdered or like thermoplastic material is fed from feed hopper 57 via feed screw 56 to the hopper 43 for delivery to the tubular rod 44 which conveys via its flighted screw 45 to the torpedo 47. Since the screw 45 is designed with deep flights and with little or no compression ratio, the screw 45 can be run with low temperature on the barrel and thus with no heating, fluxing or "working" of the plastic. Since the screw 45 will supply only conveying force to the plastic, it is the propulsion unit. The torpedo 47 being shallow flighted has no propelling action on the plastic but will heat the plastic quickly by the high shear and intensive mixing, thereby acting as the working unit. The torpedo 47 and the screw 45 can be made in one piece or the torpedo can be made as a removable unit. The total working of the plastic can be accurately controlled by speeding up the rotation of the torpedo 47 thereby putting more heat into the plastic while slowing down the delivery rate of the thermoplastic into the hopper 43 by slowing down the motor 55. To decrease or increase the temperature of the extrudate, the rotation of the torpedo may be varied up or down to effect the shear and temperature rise of such thermoplastic extrudate. Since the deep flighted screw will have excess propulsion capacity, the time the plastic will be in the torpedo or work area can be adjusted up or down by such motor 55 whereby the feed rate is varied. The temperature of the thermoplastic worked material may be further controlled by the extaction of or addition of heat via fluid medium though the respective jackets 49, 50 and the tube 48.

Various modifications are contemplated and may obviously be resorted to by those skilled in the art without departing form the spirit and scope of the invention, as hereinafter defined by the appended claims, as only preferred embodiments thereof have been disclosed.

What is claimed is:

1. An apparatus for extruding thermoplastic materials comprising a casing, one portion of said casing having a bore extending longitudinally therethrough, the other portion of said casing having a bore communicating with said first mentioned bore and disposed angularly thereto, said casing having an inlet opening and a discharge opening communicating with said bore; said openings being spaced at different ends of said casing, a torpedo mounted in said bore of said other portion closely adjacent said discharge opening, a rod with conveying flights thereon supporting said torpedo, a flighted conveyor screw mounted in said bore of said one portion, drive means operatively connected to said torpedo and said screw for rotating said torpedo and rod at different preselected speeds, said rod having a passageway extending longitudinally therethrough, said torpedo being recessed to communicate with said passageway, said passageway having a tube operative to convey cooling fluids to said recess in said torpedo to cool said torpedo, and said rod having an insulated sleeve providing a clearance space between said tube and said sleeve for the return of cooling fluid from said recess.

2. An apparatus for extruding plastic materials comprising a casing having an elongated tubular barrel, an elongated hollow worm screw rotatably mounted in said barrel, means connected to one end of said worm screw for rotating said screw, said barrel having an inlet opening and a discharge opening, said inlet opening having a hopper by which plastic materials may be fed by said hollow worm screw toward said discharge opening, a torpedo secured to the other end of said hollow worm screw, said torpedo being adjacent to said discharge opening, an insulating tubular rod closely received by said hollow worm screw to prevent the transfer of heat thereto, said insulating tubular rod having a central bore, said torpedo being centrally recessed, said casing having encompassing jackets for the circulation of fluids to transfer heat thereto or therefrom, a tube extending through said central bore of said insulating tubular rod and into said central recess of said torpedo to provide for the flow of coolant into said recess of said torpedo, and said tube providing a clearance space between the outer wall of said tube and the inner wall of said insulating tubular rod to provide for flow back of said coolant through said clearance space away from said torpedo.

References Cited

UNITED STATES PATENTS

| | | | |
|---|---|---|---|
| Re. 23,240 | 1/1950 | Magerkurth | 18—12(SE) |
| 3,008,187 | 11/1961 | Slade | 18—14 |
| 3,160,688 | 12/1964 | Aykanian | 18—14(M) |
| 3,177,527 | 4/1965 | Nelson | 18—12(SH) |
| 3,360,821 | 1/1968 | Marcus | 18—12(C) |
| 3,362,044 | 1/1968 | Irving | 18—14(M) |
| 3,387,331 | 6/1968 | Billings | 18—14 |
| 1,156,096 | 10/1915 | Price | 18—12(SS) |
| 2,449,355 | 9/1948 | Wiley | 18—12(ST) |
| 2,453,088 | 11/1948 | Dulmage | 18—12(SE) |
| 2,568,332 | 9/1951 | Genovese | 18—12(SH) |
| 2,572,063 | 10/1951 | Skipper | 18—12(SS) |
| 2,607,077 | 8/1952 | Dulmage | 18—12(SE) |
| 2,674,104 | 4/1954 | Street | 18—12(SP) |
| 2,722,716 | 11/1955 | Henning | 18—12(ST) |
| 2,736,058 | 2/1956 | Dellheim | 18—12(SH) |
| 2,783,498 | 3/1957 | Richardson | 18—12(SS) |
| 3,050,779 | 8/1962 | Farley | 18—30(JT) |
| 3,070,836 | 1/1963 | De Haven | 264—40 |
| 3,148,231 | 9/1964 | Spencer | 264—40 |
| 3,270,806 | 9/1966 | Borrini | 18—12(SJ) |
| 3,305,893 | 2/1967 | Machen | 18—12(SE) |
| 3,360,824 | 1/1968 | Schippers | 18—12(SH) |
| 3,376,604 | 4/1968 | Hanslik | 18—12(SS) |
| 3,421,182 | 1/1969 | Colombo | 18—12(SP) |

WAYNE A. MORSE, JR., Primary Examiner

U.S. Cl. X.R.

18—12, 14